6/30/87 XR 4,677,565

United States Patent [19]
Ogaki et al.

[11] Patent Number: 4,677,565
[45] Date of Patent: Jun. 30, 1987

[54] AUTOMATIC VENDING SYSTEM

[75] Inventors: Hirokazu Ogaki; Yuichi Yasutomo; Yoshibumi Kato; Tatsuo Kato; Takamitsu Suzuki, all of Nagoya, Japan

[73] Assignee: Brother Kogyo Kabushiki Kaisha, Aichi, Japan

[21] Appl. No.: 828,431

[22] Filed: Feb. 11, 1986

[30] Foreign Application Priority Data

Feb. 15, 1985 [JP] Japan .................... 60-28727

[51] Int. Cl.[4] .................... G06F 15/21; G06F 15/44
[52] U.S. Cl. .................... 364/479; 194/217; 235/381; 364/410
[58] Field of Search .................... 364/401, 410, 478, 479, 364/200 MS File, 900 MS File; 235/379, 380, 381; 194/217; 273/1 E; 340/825.35

[56] References Cited

U.S. PATENT DOCUMENTS 4,414,467 11/1983 Gould .................... 273/1 E X
4,438,326 3/1984 Uchida .................... 364/900 X
4,593,361 6/1986 Otten .................... 364/479
4,593,376 6/1986 Volk .................... 364/479 X
4,597,058 6/1986 Izumi et al. .................... 364/479 X
4,598,810 7/1986 Shore .................... 235/381 X

*Primary Examiner*—Joseph Ruggiero
*Attorney, Agent, or Firm*—Parkhurst & Oliff

[57] ABSTRACT

A vending system for automatic sale of articles selected by a customer, comprising a display for displaying groups of vending information in respective steps of a vending procedure that are executed to select one of the articles. The vending system comprises an advancing key and a returning key which enable the vending procedure to be advanced from the currently established step to the next, or to be reversed to revert to the preceding step. The vending system further comprises a payment-control device for commanding the display to display a price of the selected article, and for detecting an amount of a payment medium deposited for the selected article. The selected article is delivered when the detected amount of the payment medium is equal to or larger than the displayed price.

5 Claims, 9 Drawing Figures

AUTOMATIC VENDING SYSTEM

BACKGROUND OF THE INVENTION

1. Field of the Art

The present invention relates to a vending system for automatic sale of articles selected by a customer.

2. Related Art Statement

Various automatic vending systems or machines are known, wherein a desired article is selected by a customer from among a plurality of choices, and the selected article is delivered by a suitable device. In such known vending systems, a given amount of money is deposited before the desired article is selected. Accordingly, the articles that can be bought by the customer are limited within a scope of the deposited amount of money.

PROBLEM SOLVED BY THE INVENTION

Since the range of selection of the articles is determined by the amount of money which has been deposited into such vending machines, the customer or purchaser is not permitted to buy an article the price of which exceeds the deposited amount of money, in the case where the customer changes a decision on the selection of an article after the money has been deposited.

In some of the known machines, it is impossible to cancel an already selected article and select another article while looking at a list of articles. In this case, the customer may be forced to buy an article which is not the choice really desired by the customer. In the meantime, some vending machines have provisions for returning money which has been deposited. In this instance, however, a series of steps to buy an article should be repeated from the beginning after manipulating a lever for returning the deposited money and depositing again a suitable amount of money. Hence, a change in selection of articles from one article to another requires a cumbersome procedure.

SUMMARY OF THE INVENTION

It is therefore an object of the present invention to provide an improved vending system which permits a customer to make a selection of desired one of articles prior to depositing money, and to change the selection of articles from one article to another, thereby providing a wider range of selection of the articles and allowing the selection of the desired article in a shorter time.

According to the invention, there is provided a vending system for automatic sale of a plurality of articles selected by a customer, comprising: (a) memory means for storing sets of display data representative of corresponding groups of vending information which are displayed respectively in predetermined plural steps of a vending procedure that are executed to select at least one of the articles; (b) display means for displaying the groups of vending information, based on the sets of display data; (c) selector means which is operated by the customer for selecting one of items of the group of vending information displayed on the display; (d) advancing means which is operated by the customer, for advancing the vending procedure from currently established one of the plural steps to the next step; (e) returning means which is operated by the customer, for reversing the vending procedure to revert to preceding one of the plural steps which precedes the currently established step; (f) display-control means, responsive to the advancing means, for reading out from the memory means one of the sets of display data which corresponds to the above-indicated next step, and for commanding the display means to display the corresponding group of vending information, the display-control means being responsive to the returning means, for reading out from the memory means one of the sets of display data which corresponds to the above-indicated preceding step, and for commanding the display means to display the corresponding group of vending information; (g) payment-control means for commanding the display means to display a price of the at least one article which has been selected by activation of the selector means, the advancing means and the returning means, the payment-control means detecting an amount of a payment medium deposited for the at least one selected article; and (h) vending means, responsive to the payment-control means, for delivering the at least one selected article when the amount of the payment medium detected by the payment-control means is equal to or larger than the price of the at least one selected article displayed on the display means.

In the vending system constructed as described above, it is possible to select a desired article with the selector means and the advancing means, before a payment medium as in the form of coins, paper money and a credit card is deposited. Further, it is possible to cancel an article once selected, by activating the returning means in place of the advancing means. With the desired article selected, the payment-control means is ready to detect an amount of the payment medium to be deposited by the customer. If the detected amount of the deposited payment medium is not smaller than a price of the selected article displayed on the display, the vending means is activated to deliver the selected article.

According to one embodiment of the invention, the plurality of articles for sale comprise a plurality of software programs, and the vending means comprises recording means for recording selected one of the software programs.

According to another embodiment of the invention, the display-control means controls the display means so as to switch a display on the display means, from one of the groups of vending information which corresponds to the currently established step, to the group of vending information which corresponds to the preceding step, when a predetermined length of time has lapsed after commencement of the display of the group of vending information corresponding to the currently established step.

The vending system may further comprise restarting means which is operated by the customer and is operable while one of the plural steps is established. The restarting means, when activated, restarts the vending procedure, whereby the first step of the procedure is established. In this case, the restarting means may consists of a start key which is normally activated to start the vending procedure.

BRIEF DESCRIPTION OF THE DRAWINGS

The above and other objects, features and advantages of the present invention will become more apparent from reading the following detailed description of a preferred embodiment of the invention, when considered in connection with the accompanying drawings, in which.

DETAILED DESCRIPTION OF THE PREFERRED EMBODIMENTS

To further clarify the concept of the present invention, a preferred embodiment of the invention will be described in detail referring to the accompanying drawings.

Figure 1:
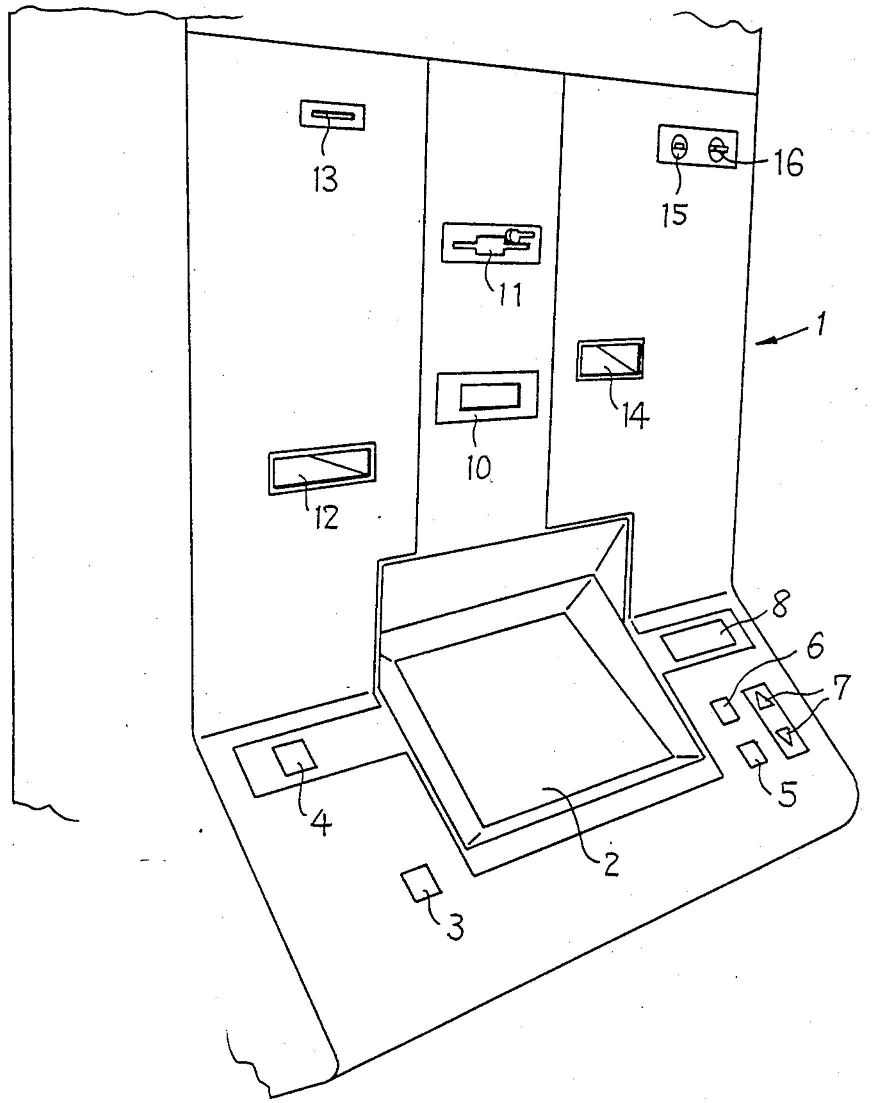
FIG. 1 is a fragmentary view in perspective of a vending system in the form of a software vending instrument embodying the present invention.

There is shown in FIG. 1 a vending system in the form of a software vending instrument 1 (hereinafter referred to as "vending instrument"). The vending instrument 1 includes display means in the form of a cathode ray tube 2 (hereinafter referred to as "CRT"), which is disposed on the front side of the housing of the instrument 1. To the left of the CRT 2, there are disposed a START key 3 and a CALL key 4 which are operated by a customer. The START key 3 is used to start the vending instrument 1, while the CALL key 4 is used to call an owner of the vending instrument 1 or other persons responsible for the vending instrument 1, when a trouble occurs while the vending instrument 1 is in operation.

To the right of the CRT 2, there are provided advancing means and returning means in the form of a FORWARD key 5 and a BACKWARD key 6, respectively. The FORWARD key 5, when operated by the customer, advances a vending procedure of the vending instrument 1, from a currently established step to the next. More specifically, the vending procedure comprises a plurality of steps, and a group of vending information is displayed on the CRT 2 in each step, in order to enable the customer to select a desired software program from among a plurality of choices, as described later in greater detail. The BACKWARD key 6 is used to reverse the vending procedure to revert to the step which precedes the currently established step. Thus, the vending information displayed on the CRT 2 is changed each time the FORWARD or BACKWARD key 5, 6 is activated.

To the right of the FORWARD and BACKWARD keys 5, 6 is disposed selector means in the form of two CURSOR keys 7 which, when activated, move a cursor *7a* (FIGS. 4 and 5) on the CRT 2, in order to select one of items of the group of vending information currently displayed on the CRT 2. Above the BACKWARD and CURSOR keys 6, 7, there is provided a change tray 8 for receiving changes.

In an upright section of the housing of the vending instrument 1, there is incorporated vending means in the form of a cassette tape recorder 10 and a floppy disk drive 11, which are selectively operated to record a selected software program in a tape cassette or floppy disk which is set by the customer.

A part of the upright section of the housing above the CALL key 4, has a print paper inlet 12 and a credit card slot 13. The print paper inlet 12 receives a paper on which a printer 29 (which will be described) prints instructions to execute the software program which has been recorded on the tape cassette or floppy disk. The credit card slot 13 receives a credit card as one form of a payment medium usable by the customer to buy the software programs.

Above the change tray 8, there are incorporated a paper-money inlet 14 for receiving bills, and an coin slot 15 for receiving coins. To the left of the coin slot 15 is a return lever 16 to return deposited money to the customer.

Figure 2:
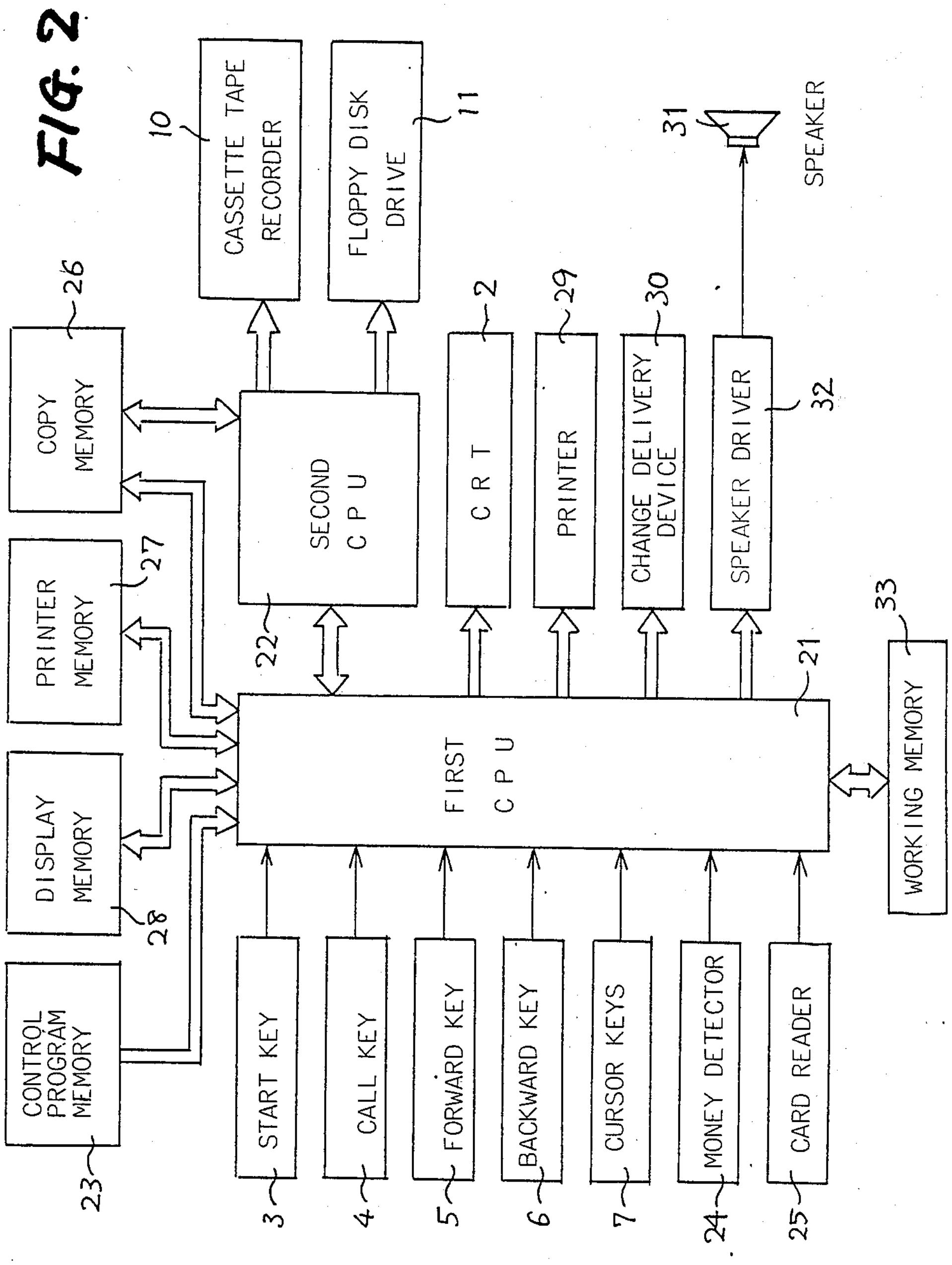
FIG. 2 is a schematic block diagram of an electrical control arrangement of the vending instrument.

Referring next to a block diagram of FIG. 2, an electrical control arrangement of the vending instrument 1 will be described.

In the figure, reference numerals 21 and 22 designate a first and a second central processing unit, respectively, which serve as control means for controlling the operations of various components of the vending instrument 1 such as the CRT 2, tape recorder 10, and floppy disk drive 11. The first and second central processing units 21, 22 (hereinafter referred to as "first and second CPUs") are connected for interactive data communication, and are operated according to a control program shown in the flow charts of FIGS. 7–9, as described later in detail. The control program is stored in a read-only memory in the form of a CONTROL PROGRAM memory 23 connected to the first CPU 21.

The first CPU 21 is adapted to receive signals from the previously described keys 3–7, and detection signals which are generated by a money detector 24 and a card reader 25. The money detector 24 is adapted to detect an amount of bills and coins which are deposited through the paper-money inlet 14 and the coin slot 15. The card reader 25 is adapted to read a credit card. The money detector 24 and the card reader 25 are incorporated in suitable parts of the vending instrument 1, as detecting means which cooperates with the tape recorder 10 and the floppy disk drive 11 to constitute vending means.

The first and second CPUs 21, 22 are connected to a COPY memory 26 which stores all software programs (GAME programs for video games, EDUCATIONAL programs for educational purpose, and BUSINESS programs for business purpose). The first CPU 21 is further connected to a PRINTER memory 27 and a DISPLAY memory 28. The PRINTER memory 27 stores printing data for operating the printer 29 to provide printouts of instructions for the individual software programs.

The DISPLAY memory 28 stores sets of display data representative of the corresponding groups of vending information which are displayed on the CRT 2, as previously indicated, in the respective steps of the vending procedure which are executed in a predetermined order. As described later in more detail, the customer is prompted to select desired one of the software programs, while viewing the vending information displayed in each step of the vending procedure. The COPY memory 26, PRINTER memory 27 and DISPLAY memory 28 are constituted by a hard disk memory.

Figure 4:
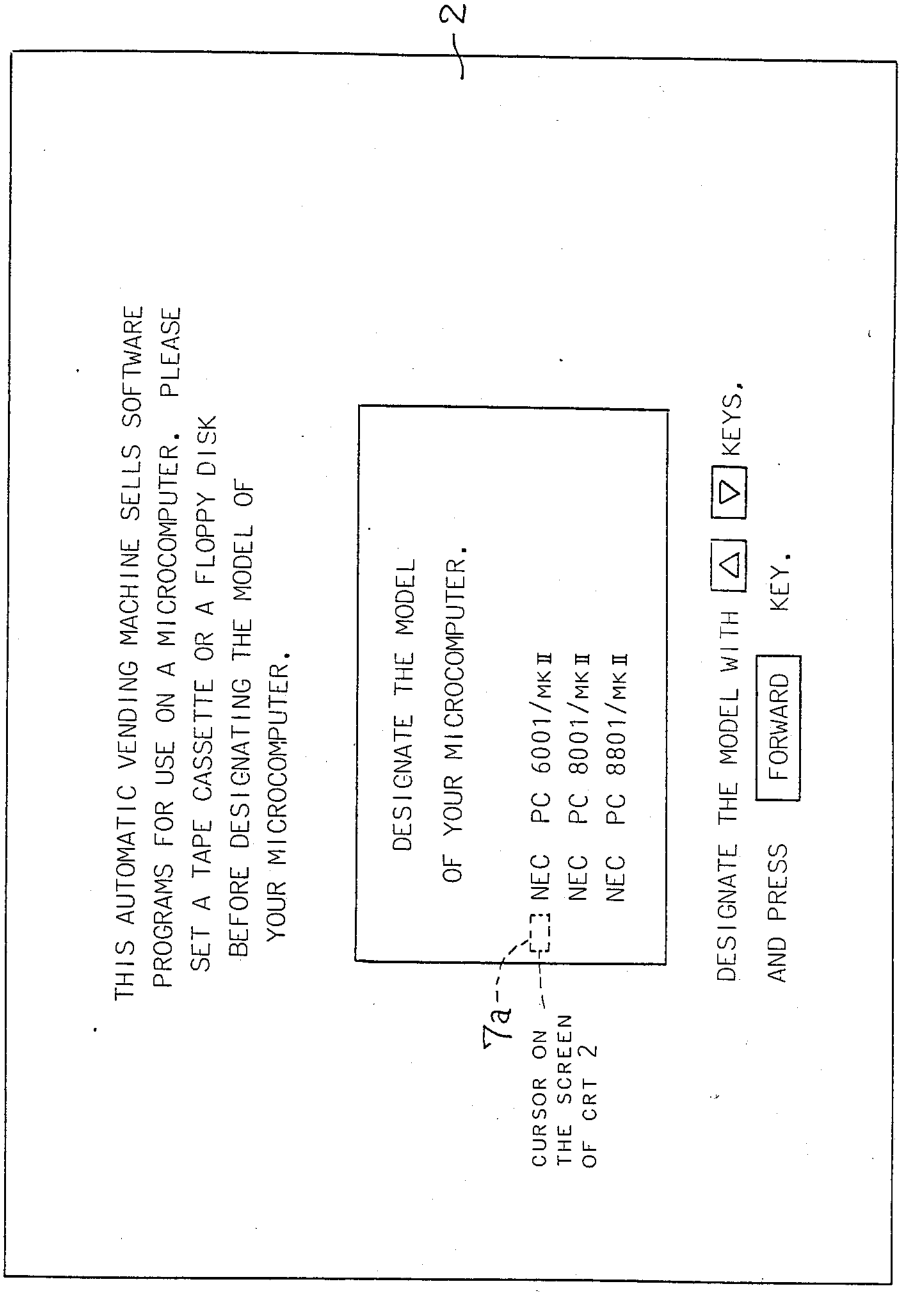
FIGS. 4–6 are views illustrating different groups of vending information provided on the CRT in respective steps of a vending procedure that enables a customer to buy a desired article.

The steps of the vending procedure used in the present embodiment comprises a COMPUTER MODEL DESIGNATING step, a PROGRAM SELECTING step and an ORDERING step. In the COMPUTER MODEL DESIGNATING step, the group of vending information shown in FIG. 4 is displayed on the CRT 2.

This group of vending information includes items which identify models of microcomputers which are used for executing a software program to be purchased by the customer. The customer is prompted by the displayed vending information to designate one of the microcomputer models listed on the screen. The set of display data representative of the vending information of FIG. 4 is stored in the DISPLAY memory 28.

Figure 5:
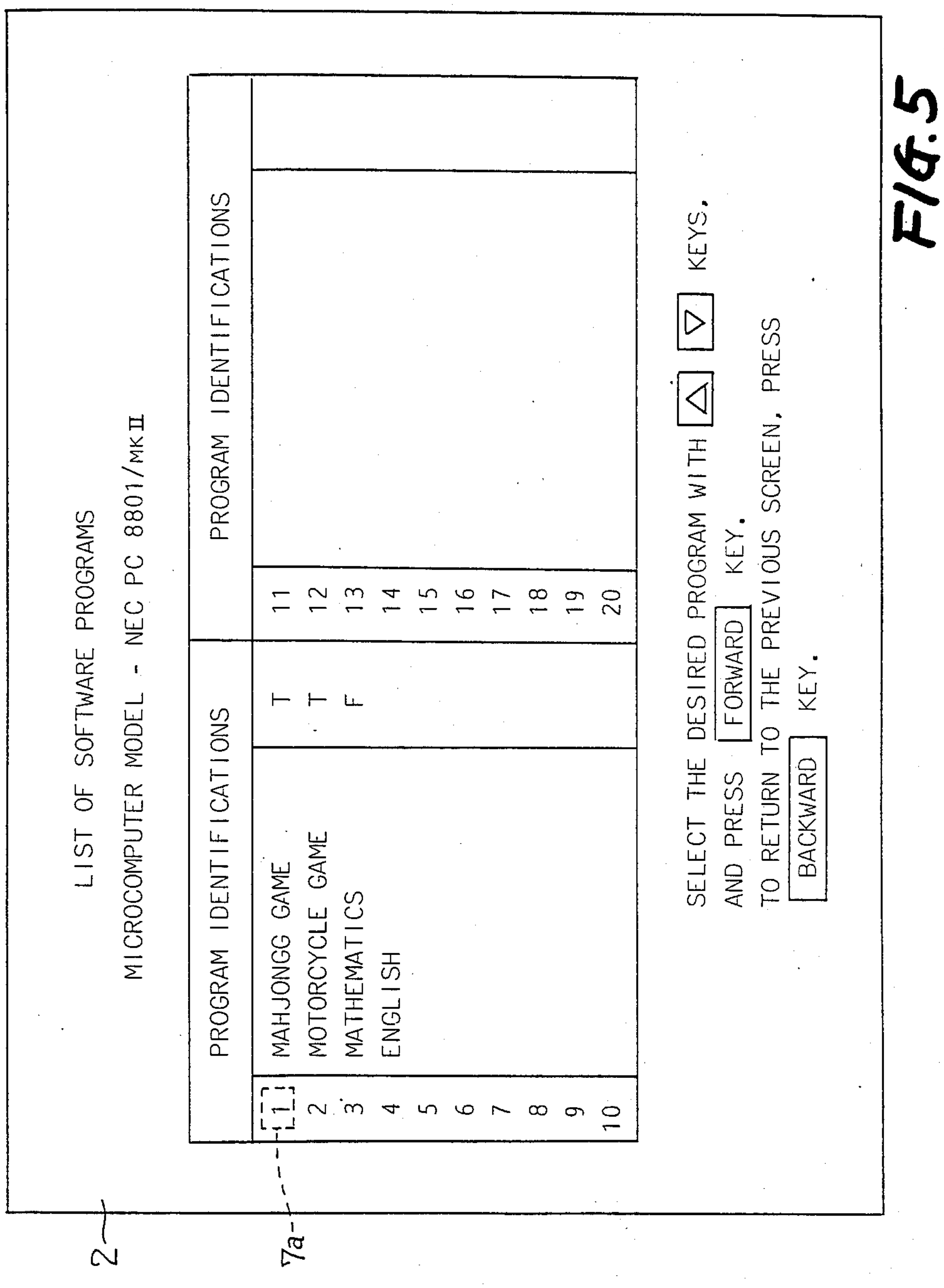

In the PROGRAM SELECTING step, the group of vending information as shown in FIG. 5 is displayed on the CRT 2. This information includes items which identify the software programs which can be executed by the microcomputer model designated in the COMPUTER MODEL DESIGNATING step, together with a recording medium (tape cassette or floppy disk) that can be used for recording the programs. The customer is prompted by the displayed information, to select one of the software programs indicated on the screen. The set of display data for selection of the software programs for each microcomputer model is stored in the DISPLAY memory 28.

Figure 6:
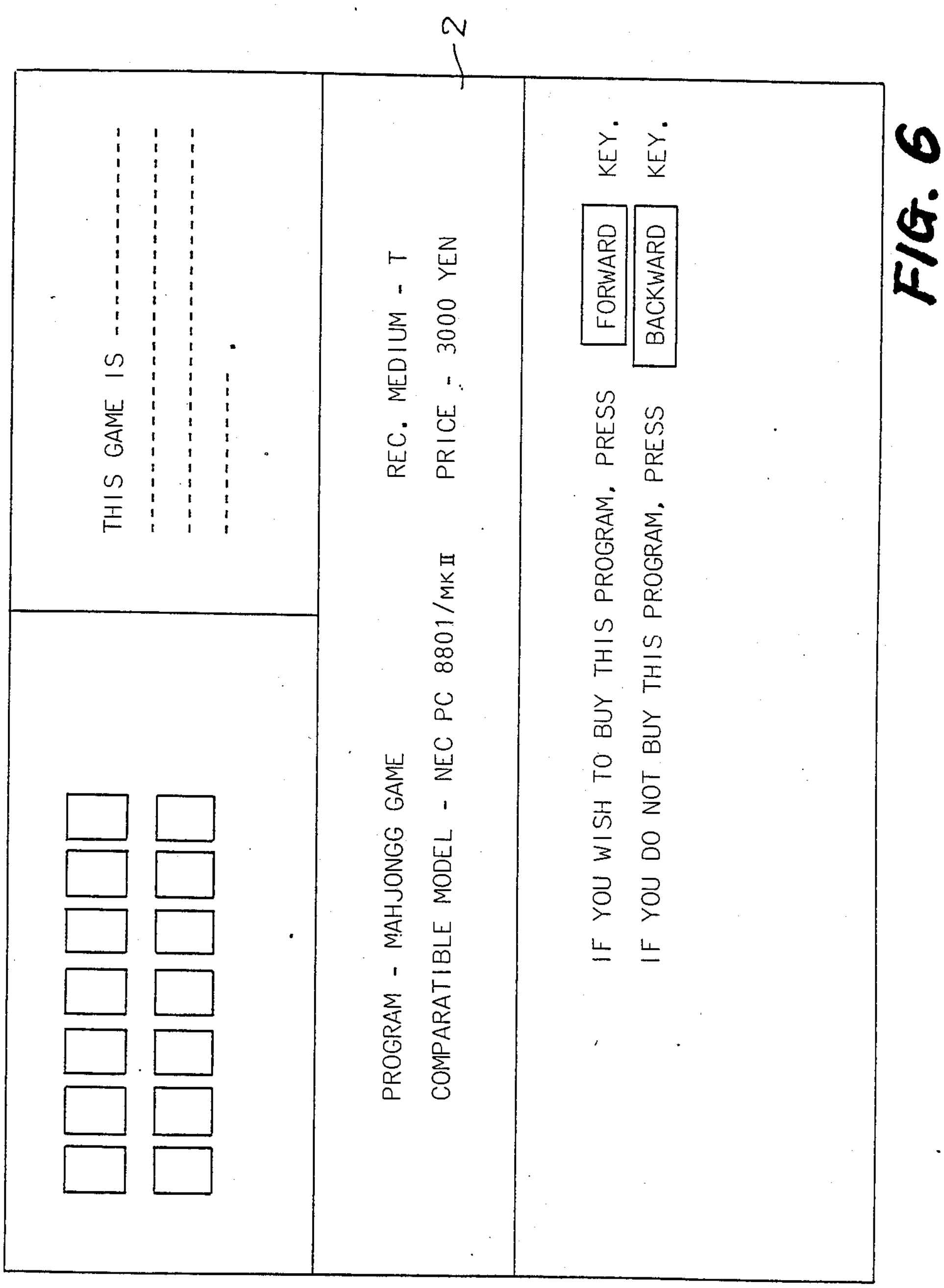

In the ORDERING step, the group of vending information as shown in FIG. 6 is displayed on the CRT 2. The information includes a description of the software program selected in the PROGRAM SELECTING step, the designated microcomputer model used for the selected program, and a selling price of the selected program. The display data representative of this vending information for each software program is also stored in the DISPLAY memory 28.

Figure 3:
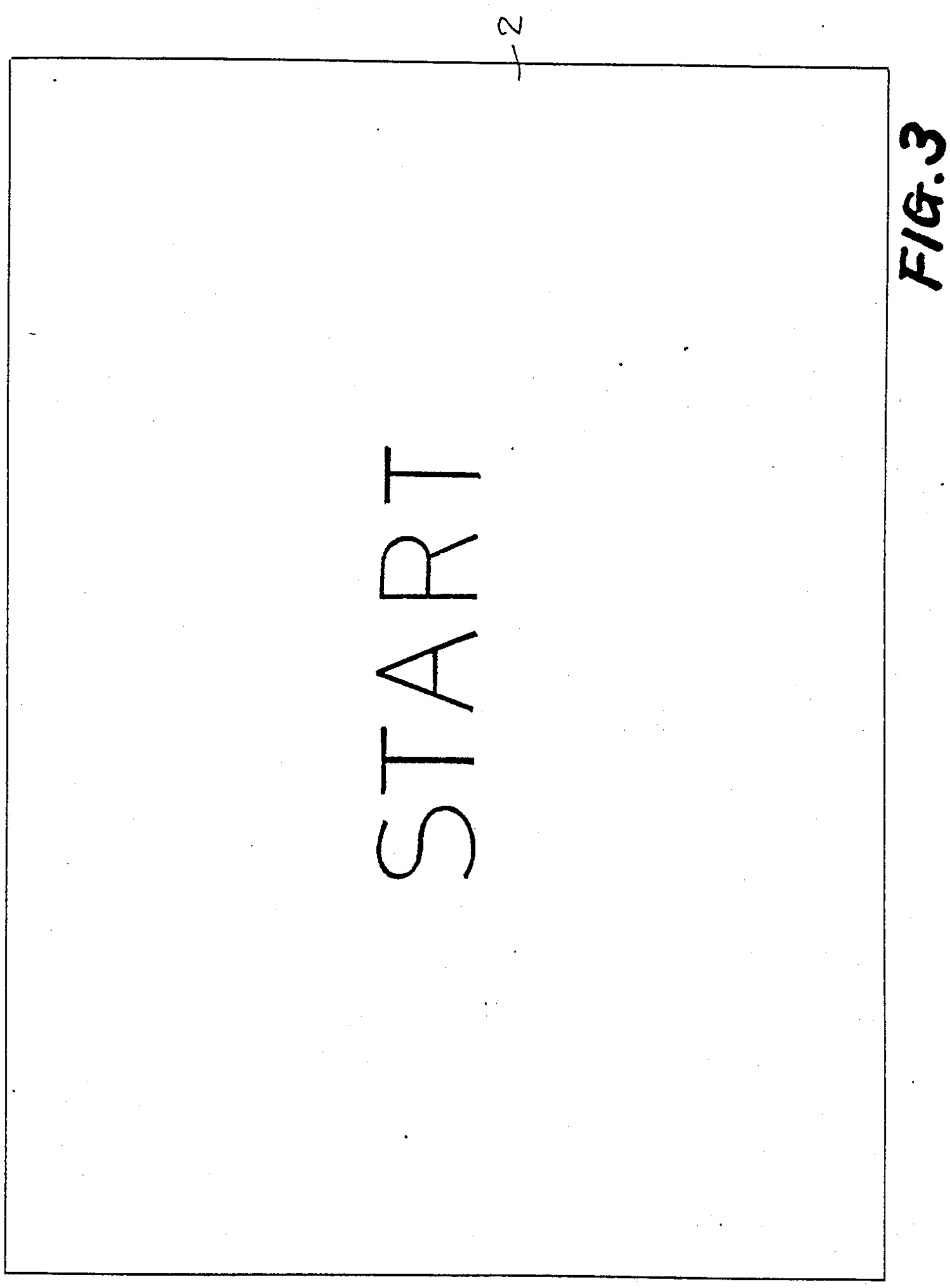
FIG. 3 is a view illustrating information which is provided on a CRT on the vending instrument when a start key is activated.

In response to a signal from the START key 3 upon activation thereof, the first CPU 21 commands the CRT 2 to display the word "START" as illustrated in FIG. 3, for two seconds, and reads out from the DISPLAY memory 28 the set of display data which represents the group of vending information of FIG. 4 for the COMPUTER MODEL DESIGNATING step. This vending information is displayed on the CRT 2.

The customer viewing the displayed vending information of FIG. 4, is prompted to move the cursor 7a on the screen of the CRT 2 with the appropriate CURSOR keys 7, and thereby designate the appropriate microcomputer model. Further, the customer is prompted to press the FORWARD key 5. As a result, the vending procedure is advanced to the PROGRAM SELECTING step. In response to a signal from the activated FORWARD key 5, the first CPU 21 reads out from the DISPLAY memory 28 the set of display data which is representative of a group of vending information listing a group of software programs which can be executed on the designated model of microcomputer. The first CPU 21 then commands the CRT 2 to display the vending information on the CRT 2, as indicated in FIG. 5.

The customer is prompted by the displayed information, to select one of the programs by moving the cursor 72 with the CURSOR keys 7, and then press the FORWARD key 5. Consequently, the vending procedure is further advanced to the ORDERING step. Upon activation of the FORWARD key 5, the first CPU 21 reads out from the DISPLAY memory 28 the set of display data representative of the vending information on the selected software program, and commands the CRT 2 to display this vending information, as indicated in FIG. 6.

When the FORWARD key is pressed again, the first CPU 21 becomes ready to receive money deposited through the paper-money inlet 14 and/or coin slot 15, or a credit card inserted through the card slot 13. More specifically, the first CPU 21 receives a signal from the money detector 24 or card reader 25, and judges that the amount of the deposited money or the credit card is sufficient for the selected software program. Subsequently, the first CPU 21 applies a signal to the second CPU 22. In response to this signal, the second CPU 22 reads out from the COPY memory 26 the selected software program, and commands the tape recorder 10 or the floppy disk drive 11 to record the read-out software program on a tape cassette or a floppy disk.

In the event that the BACKWARD key 6 is activated or any keys are held off for more than one minute while the first CPU 21 is waiting for the activation of the FORWARD key 5 in one of the previously described three steps, the first CPU 21 reads out from the DISPLAY memory 28 the set of display data which represents the group of vending information for the preceding step, i.e., the set of display data representative of the vending information which was displayed last. For example, if the currently established step is the PROGRAM SELECTING step, the set of display data for the COMPUTER MODEL DESIGNATING step is read out from the DISPLAY memory 28 and the corresponding group of vending information is displayed on the CRT 2. If the ORDERING step is currently established, the first CPU 21 reads out the set of display data corresponding to the vending information which was previously displayed in the PROGRAM SELECTING step, whereby the previously displayed vending information is displayed again on the CRT 2. Thus, the first CPU 21 returns to the preceding step, upon activation of the BACKWARD key 6.

If the START key 3 is activated while the first CPU 21 is waiting for the activation of the FORWARD key 5, the first CPU 21 returns to the COMPUTER MODEL DESIGNATING step, to restart the vending procedure. In this case, the first CPU 21 commands the CRT 2 to display the word "START" for two seconds. Then, the first CPU 21 reads out from the DISPLAY memory 28 the set of display data for the COMPUTER MODEL DESIGNATING step, and commands the CRT 2 to display the corresponding vending information.

The previously indicated printer 29, which is incorporated in the vending instrument 1, is operated under the control of the first CPU 21, and according to the printing data read out from the PRINTER memory 27, in order to effect printing on the paper inserted through the print paper inlet 12, the printed information containing the instructions for executing the selected software program. The first CPU controls a change delivery device 30 also incorporated in the vending instrument 1, to deliver a calculated amount of change to the change tray 8, if necessary.

A speaker 31 is provided at a suitable location within hearing range of the owner of the vending instrument 1 or other persons responsible of the instrument 1. Upon activation of the CALL key 4, the first CPU 21 activates the speaker 31 through a speaker driver 32.

The first CPU 21 is provided with a working memory in the form of a random-access memory 33 which serves to temporarily store results of arithmetic operation and judgement or decision conducted by the first CPU 21.

Figure 7:
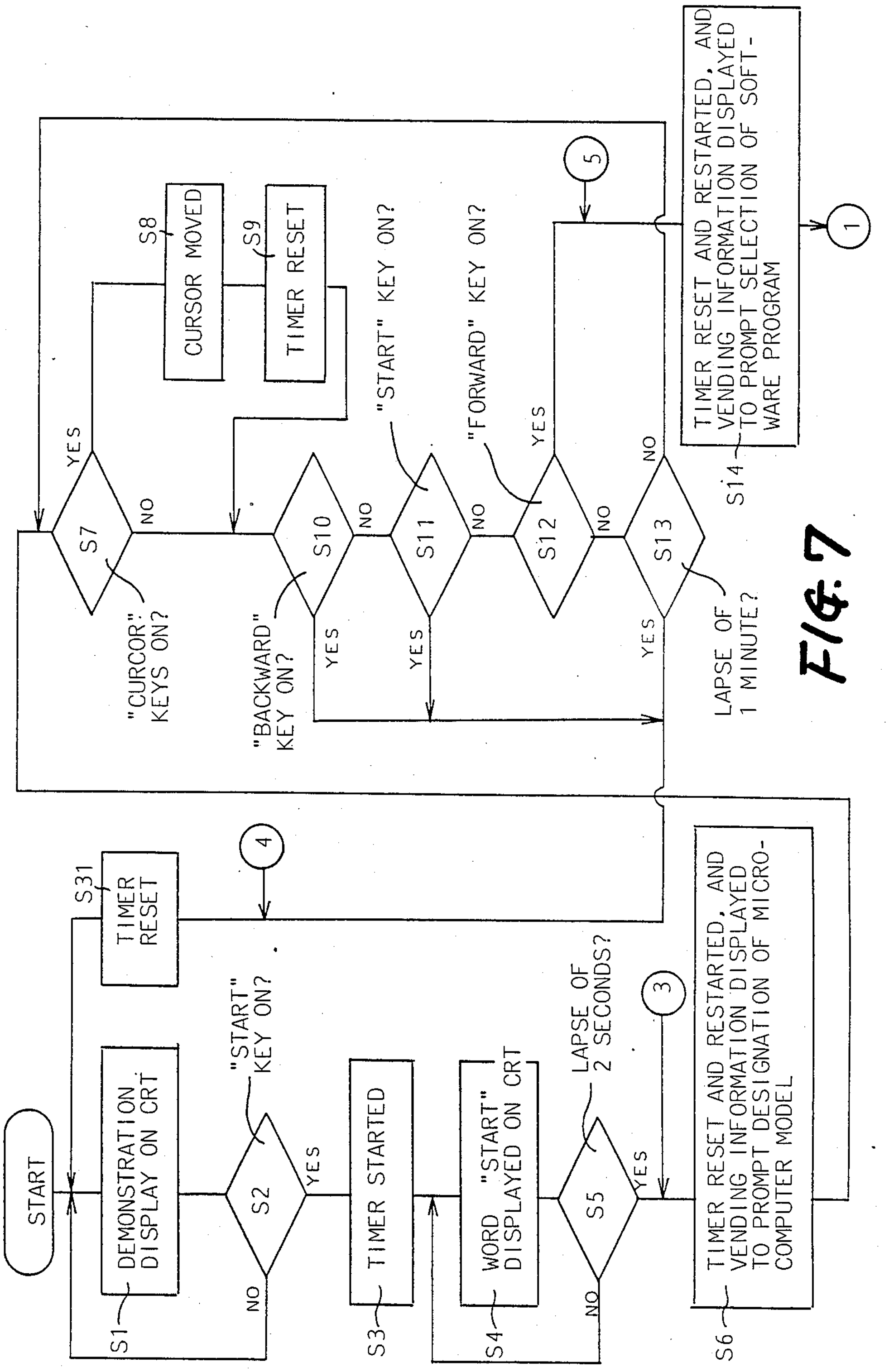
FIGS. 7–9 are flow charts showing the operation of the vending instrument.
Figure 8:
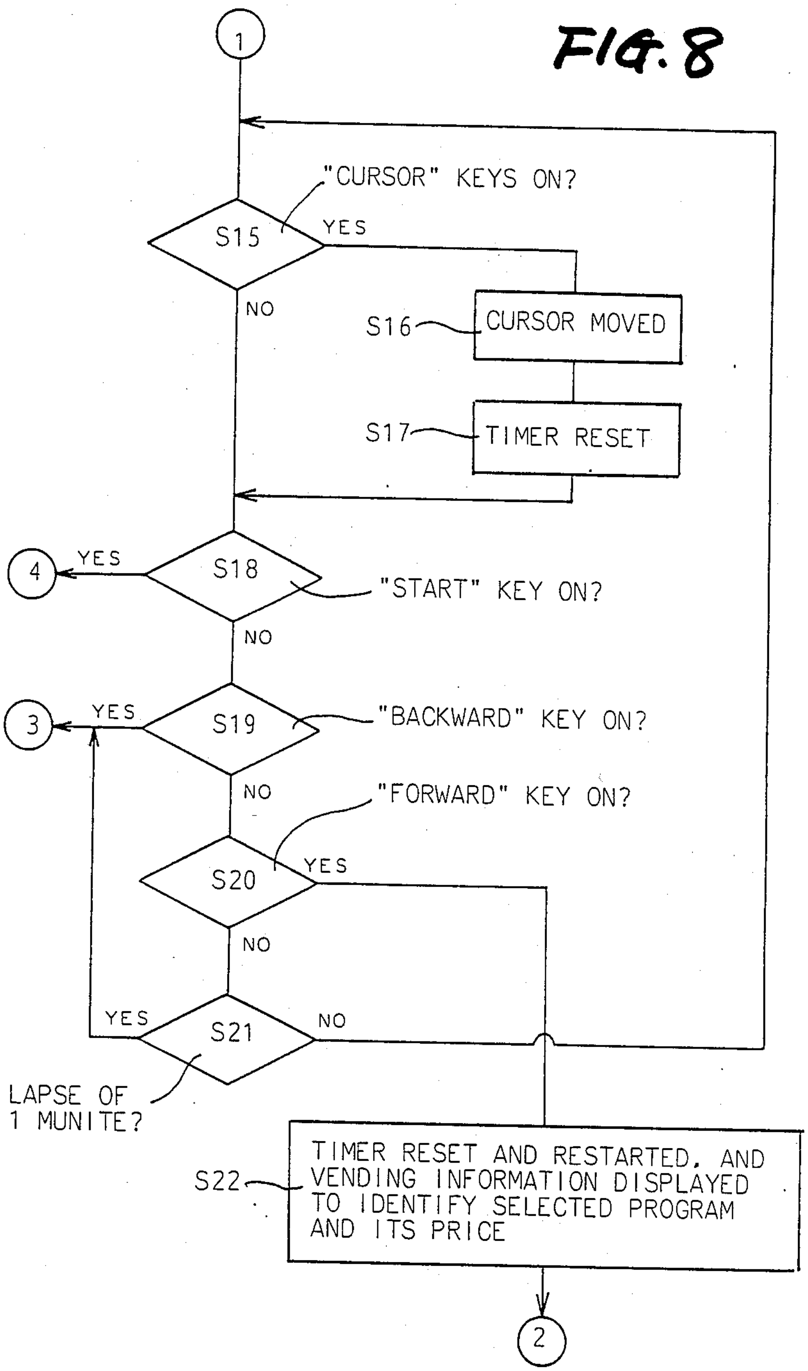
Figure 9:
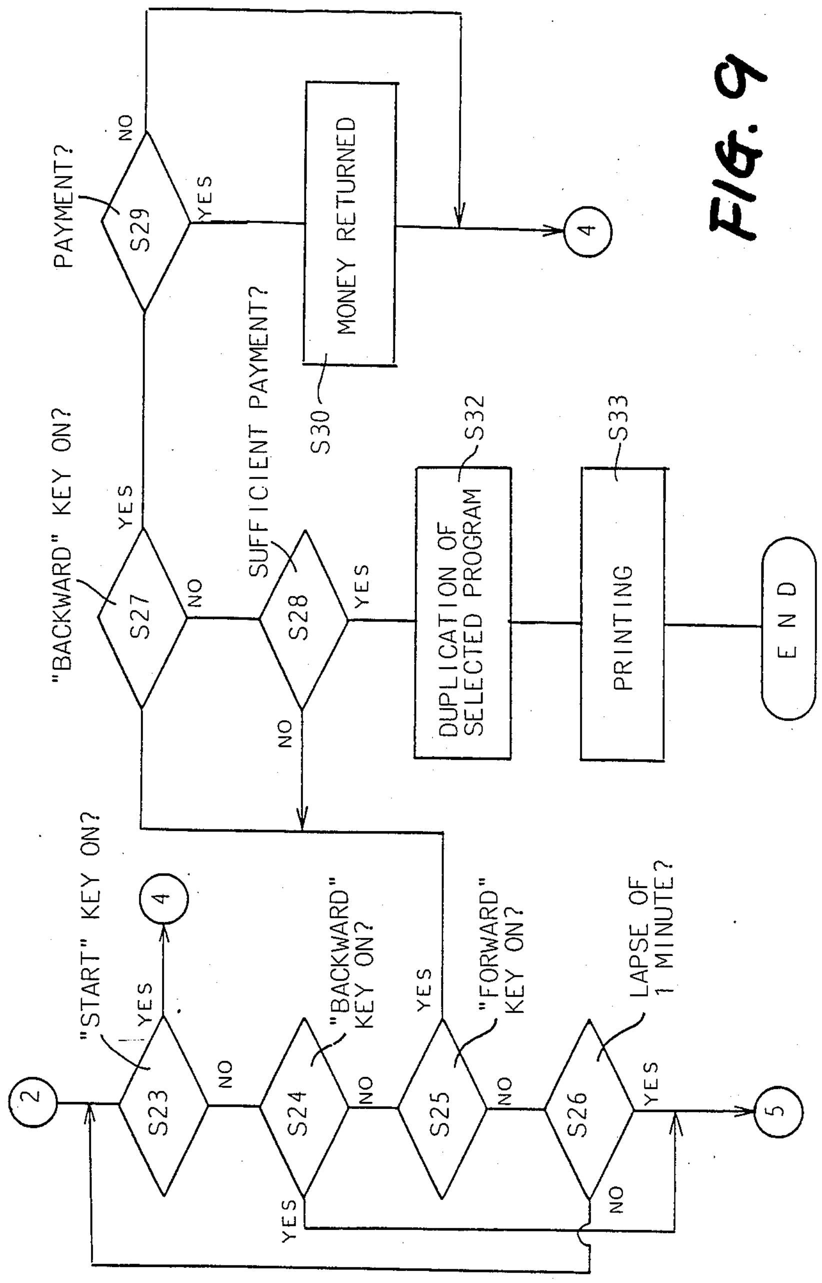

The operation of the vending instrument 1 which is constructed as described hitherto will be described in detail, referring to the flow charts of FIGS. 7–9. For easy understanding, events of operation are indicated by step numbers in the figures, and the appropriate step numbers are given in parentheses in the following description.

Normally, the vending instrument 1 provides a predetermined demonstration display on the CRT 2 (step S1). When the customer activates the START key 3 in this condition to purchase a software program (step S2), the first CPU 21 turns on a timer incorporated therein (step S3), and commands the CRT 2 to provide the word "START" (as shown in FIG. 3) for two seconds (steps S4 and S5). After a lapse of two seconds, the first CPU 21 reads out from the DISPLAY memory 28 the set of display data representative of the vending information for the COMPUTR MODEL DESIGNATING step, and commands the CRT 2 to provide the vending information which identifies various models of microcomputers usable for implementation of software programs, and which prompts the customer to designate the appropriate microcomputer model (step S6). At the same time, the first CPU 21 resets and restarts the timer (step S6).

In response to the displayed vending information, the customer designates the model of a microcomputer to be used for a software program to be purchased, by moving the cursor *7a* on the CRT 2 with the CURSOR keys 7 (steps S7–S13). With the FORWARD key 5 pressed after the designation of the microcomputer model (step S12), the first CPU 21 resets and restarts the timer (step S14). Further, the first CPU 21 reads out from the DISPLAY memory 28 the set of display data representative of the vending information for the PROGRAM SELECTING step, and commands the CRT 2 to provide the vending information as illustrated in FIG. 5, which lists a group of software programs that can be executed by the designated microcomputer, together with the indication of a recording medium (tape cassette or floppy disk) which should be used for recording or duplication of these software programs (step S14).

While observing the displayed vending information on the CRT 2, the customer selects desired one of the listed software programs, by moving the cursor *7a* with the CURSOR keys 7 (steps S15–S21). If the customer wishes to cancel the designated microcomputer model, i.e., to return to the preceding COMPUTER MODEL DESIGNATING step (steps S6–S13), the BACKWARD key 6 is pressed (step S19). In this case, the first CPU 21 goes back to step S6, whereby the customer is permitted to re-designate another microcomputer model.

When the FORWARD key 5 is activated (step S20) after the desired software program has been selected, the first CPU 21 resets and restarts the timer, and reads out fromt the DISPLAY memory 28 the set of display data for the ORDERING step, to command the CRT 2 to provide the vending information as illustrated in FIG. 6, which identifies the selected software program and indicates its selling price (step S22). If the customer desires to cancel the selected softwre program, that is, to go back to the preceding PROGRAM SELECTING step (steps S14–S21), the BACKWARD key 6 is activated (step S24). In this case, the first CPU 21 returns to step S14. Therefore, the customer is permitted to select another software program for the designated microcomputer model. If the customer activates the BACKWARD key 6 while in the PROGRAM SELECTING step, i.e., in step S19, the first CPU 21 returns to the COMPUTER MODEL DESIGNATING step (to step S6), as previously described. Thus, the customer is permitted to carry out the purchasing procedure from the beginning. In other word, the first CPU 21 starts the vending procedure at step S6.

When the customer presses the FORWARD key 5 (step S25) after the desired software program has been selected (steps S15, S20), the first CPU 21 waits for the setting of a tape cassette in the tape recorder 10 or a floppy disk in the floppy disk drive 11, and for the payment for the selected program (steps S27 and S28). As money is deposited through the paper-money inlet 14 and/or the coin slot 15, the first CPU 21 calculates a total amount of the deposited money, based on signals from the money detector 24.

In the case where the BACKWARD key 6 is pressed (step S27) while money is deposited, the first CPU 21 checks if any amount of money has been deposited (step S29). If the checking reveals the deposition of money, the deposited money is returned to the change tray 8 (step S30), and the first CPU 21 resets the timer (step S31) and returns to the first step S1, in order to restart the vending procedure.

If the first CPU 21 judges that the detected amount of the deposited money is equal to or larger than the selling price of the selected software program (step S28), the first CPU 21 applies a DUPLICATION signal to the second CPU 22. In response to this DUPLICATION signal, the second CPU 22 reads out from the COPY memory 26 the selected software program, and commands the tape recorder 10 or floppy disk drive 11 to record the selected program in the tape cassette or floppy disk which has been set (step S32).

When a sheet of paper is inserted through the print paper inlet 12 after the recording of the selected program, the first CPU 21 reads out from the PRINTER memory 27 the printing data representative of the instructions for the selected program, and commands the printer 29 to print the corresponding instructions on the paper (step S33). The printed instruction sheet is delivered to the customer. Thus, the vending procedure is completed.

If none of the keys are operated for more than one minute, that is, if the timer has detected the lapse of one minute (steps S13, S21 and S26) while the first CPU 21 is waiting for the activation of the FORWARD key 5 (steps S12, S20 and S25), the first CPU 21 goes back to step S1, S6 or S14, depending upon the currently established step (COMPUTER MODEL DESIGNATING step, PROGRAM SELECTING step, or ORDERING step).

If the START key 3 is activated (steps S11, S18 and S23) while the first CPU 1 is waiting for the activation of the FORWARD key 5 (steps S11, s18 and S23), the first CPU 21 returns to the initial step S1 after resetting the timer (step S31).

As is apparent from the foregoing detailed description, the amount of money deposited will not limit a range of selection of articles on sale on the present vending instrument 1, because the payment for the desired article (software program) is required after the article is selected. Further, the present embodiment is advantageous in that the customer is permitted to cancel the already selected article by the activation of the BACKWARD key 6 which reverses the vending procedure to revert to the preceding selection step, i.e., from the PROGRAM SELECTING step to the COMPUTER MODEL DESIGNATING step, or from the ORDERING step to the PROGRAM SELECTING step. Consequently, the customer is not forced to purchase an article which is not desired or which is erroneously selected.

While the present invention has been described in its preferred embodiment with a certain degree of particularity, it is to be understood that the invention may be embodied with various changes, modifications and improvements which may occur to those skilled in the art, provided that the selection of an article is accomplished prior to the payment for the article, and that an article once selected may be easily cancelled for selection and ordering of another article.

What is claimed is:

1. A vending system for automatic sale of a plurality of articles which are selected by a customer, comprising:

memory means for storing sets of display data representative of corresponding groups of vending information which are displayed respectively in predetermined plural steps of a vending procedure that are executed to select at least one of said articles;

display means for displaying said groups of vending information, based on said sets of display data;

selector means which is operated by the customer for selecting one of items of the group of vending information displayed on said display means;

advancing means which is operated by the customer, for advancing said vending procedure from currently established one of said plural steps to the next step;

returning means which is operated by the customer, for reversing said vending procedure to revert to preceding one of said plural steps which precedes the currently established step;

display-control means, responsive to said advancing means, for reading out from said memory means one of said sets of display data which corresponds to said next step, and for commanding said display means to display the corresponding group of vending information, said display-control means being responsive to said returning means, for reading out from said memory means one of said sets of display data which corresponds to said preceding step, and for commanding said display means to display the corresponding group of vending information;

payment-control means for commanding said display means to display a price of said at least one article which has been selected by activation of said selector means, said advancing means and said returning means, said payment-control means detecting an amount of a payment medium deposited for the at least one selected article; and vending means, responsive to said payment-control means, for delivering said at least one selected article when the amount of said payment medium detected by said payment-control means is equal to or larger than said price of the at least one selected article displayed on said display means.

2. A vending system according to claim 1, wherein said articles comprise a plurality of software programs, and said vending means comprises recording means for recording selected one of said software programs.

3. A vending system according to claim 1, wherein said display-control means controls said display means so as to switch a display on the display means, from one of said groups of vending information which corresponds to said currently established step, to the group of vending information which corresponds to said preceding step, when a predetermined length of time has lapsed after commencement of the display of the group of vending information corresponding to said currently established step.

4. A vending system according to claim 1, further comprising restarting means which is operated by the customer, and operable while one of said plural steps is established, said restarting means restarting said vending procedure.

5. A vending system according to claim 4, wherein said initializing means consists of a start key for starting said vending procedure.

* * * * *